US009130747B2

(12) United States Patent
Zinser et al.

(10) Patent No.: US 9,130,747 B2
(45) Date of Patent: *Sep. 8, 2015

(54) SOFTWARE RADIO FREQUENCY CANCELLER

(75) Inventors: Richard Louis Zinser, Niskayuna, NY (US); Michael James Hartman, Clifton Park, NY (US); John Erik Hershey, Balston Lake, NY (US); John Anderson Fergus Ross, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 1245 days.

This patent is subject to a terminal disclaimer.

(21) Appl. No.: 12/336,009

(22) Filed: Dec. 16, 2008

(65) Prior Publication Data
US 2010/0150033 A1 Jun. 17, 2010

(51) Int. Cl.
 H04B 3/20 (2006.01)
 H04B 1/10 (2006.01)
 H04M 9/08 (2006.01)
 H04L 5/14 (2006.01)

(52) U.S. Cl.
 CPC .............. *H04L 5/143* (2013.01); *H04L 5/1461* (2013.01)

(58) Field of Classification Search
 CPC ..... H04M 9/082; H04L 5/143; H04L 5/1461; H04L 25/08; H04L 25/03057
 USPC ............... 370/290; 375/232, 350; 379/406.08
 See application file for complete search history.

(56) References Cited

U.S. PATENT DOCUMENTS

| | | | |
|---|---|---|---|
| 5,425,105 A * | 6/1995 | Lo et al. | 381/71.8 |
| 5,568,558 A * | 10/1996 | Ramm et al. | 381/94.4 |
| 5,740,256 A * | 4/1998 | Castello Da Costa et al. | 381/94.7 |
| 6,035,312 A * | 3/2000 | Hasegawa | 708/322 |
| 6,337,884 B1 | 1/2002 | Cao et al. | |
| 6,370,245 B1 | 4/2002 | White | |
| 6,625,206 B1 | 9/2003 | Doblar | |
| 6,812,824 B1 * | 11/2004 | Goldinger et al. | 340/10.1 |
| 7,082,157 B2 | 7/2006 | Lin et al. | |
| 7,096,042 B2 | 8/2006 | Marinier | |
| 7,269,211 B2 | 9/2007 | Lin et al. | |
| 7,324,467 B2 | 1/2008 | Fleischhacker | |
| 7,349,678 B2 | 3/2008 | Salfelner | |
| 7,555,263 B1 * | 6/2009 | Rofougaran et al. | 455/20 |
| 7,613,291 B1 * | 11/2009 | Benyassine et al. | 379/406.08 |
| 2004/0001450 A1 * | 1/2004 | He et al. | 370/286 |
| 2004/0151238 A1 * | 8/2004 | Masenten | 375/219 |
| 2007/0177679 A1 | 8/2007 | Sovenyi | |
| 2008/0018795 A1 * | 1/2008 | Miyazawa | 348/625 |
| 2008/0107046 A1 | 5/2008 | Kangasmaa et al. | |
| 2008/0154957 A1 * | 6/2008 | Taylor et al. | 707/104.1 |
| 2008/0205661 A1 * | 8/2008 | Kim et al. | 381/66 |
| 2010/0150032 A1 * | 6/2010 | Zinser et al. | 370/277 |

* cited by examiner

*Primary Examiner* — Dang Ton
*Assistant Examiner* — Ryan Kavleski
(74) *Attorney, Agent, or Firm* — Jean K. Testa; Fletcher Yoder, P.C.

(57) ABSTRACT

A full-duplex RF communication system and corresponding methods use digital adaptive filters for interference cancellation. As provided, the techniques allow full-duplex radio frequency communication without frequency-, time-, or code-division multiplexing and without the use of hardware RF cancellers. Such techniques may be useful for wireless communication, such as cellular communication, radio communication, broadcasting, short-range point-to-point communication, wireless sensor networks, and wireless computer networks.

29 Claims, 5 Drawing Sheets

US 9,130,747 B2

SOFTWARE RADIO FREQUENCY CANCELLER

BACKGROUND

The invention relates generally to radio frequency (RF) interference cancellation.

A two-way RF communication system is one in which signals are transmitted bi-directionally between transceivers. Each transceiver may include a transmitter to transmit signals and a receiver to receive incoming transmissions. To avoid interference between the transmitted signal and the received signal, the communication system may receive and transmit signals at different times in what is called half-duplex communication. However, half-duplex techniques do not allow efficient two-way communication because transmitting time is lost while signals are being received.

Full-duplex techniques allow signals to be transmitted and received simultaneously, providing increased data bandwidth relative to half-duplex techniques. To avoid interference between the transmitted and received signals, full-duplex techniques may employ various strategies to separate these signals from one another. For example, full-duplex communication may employ time-division multiplexing (TDM), frequency-division multiplexing (FDM), or code-division multiplexing (CDM). In TDM, the transmitted and received signals may be transferred in different timeslots, but at a fast enough rate that the transferring appears to be simultaneous. In FDM, the transmitted and received signals may be separated enough in frequency that their modulated spectra do not overlap, and each receiver may be tuned such that it will receive the intended frequency and reject its own transmitted signal. In CDM, the signals may carry certain codes that allow certain signals to be separated from other signals.

In addition to signal division techniques, duplex communication architectures may employ hardware RF cancellers. Often, the hardware RF canceller may not provide adequate canceling, and these systems may also use an additional canceller at baseband. Accordingly, such hardware-based canceling systems may be complex and may involve multiple cancellation filters.

BRIEF DESCRIPTION

Provided herein is a method that includes receiving an analog primary signal from a radio receiver input port, an antenna, or a receiver front end; receiving an analog reference signal from a radio transmitter, wherein the radio transmitter is co-located with the radio receiver, wherein the radio transmitter is co-located with the radio receiver; converting the analog primary signal into a digital primary signal; converting the analog reference signal into a digital reference signal; processing the digital reference signal with first filter of a dual loop digital adaptive filter; subtracting the output of the first filter of the dual loop digital adaptive filter from the digital primary signal to generate a digital cancelled signal; using the digital cancelled signal as the input to the second filter of a dual loop digital adaptive filter, and using the output of the second digital adaptive filter as an input to control the filter weights of the first digital adaptive filter.

Also provided herein is a device programmed with machine-readable instructions for receiving an analog primary signal from a radio receiver input port, an antenna, or a receiver front end; receiving an analog reference signal from a radio transmitter, wherein the radio transmitter is co-located with the radio receiver; converting the analog primary signal into a digital primary signal; converting the analog reference signal into a digital reference signal; processing the digital reference signal with first filter of a dual loop digital adaptive filter; subtracting the output of the first filter of the dual loop digital adaptive filter from the digital primary signal to generate a digital cancelled signal; using the digital cancelled signal as the input to the second filter of a dual loop digital adaptive filter, and using the output of the second digital adaptive filter as an input to control the filter weights of the first digital adaptive filter.

Also provided herein is a full-duplex wireless communication system that includes a radio receiver input port, an antenna, or a receiver front end capable of receiving an analog primary signal; a radio transmitter capable of transmitting an analog transmitted signal; a directional coupler capable of sampling a portion of the analog transmitted signal to provide an analog reference signal; a first analog to digital converter capable of converting the analog primary signal into a digital primary signal; a second analog to digital converter capable of converting the analog reference signal into a digital reference signal; and a processor that includes instructions for processing the digital reference signal with first filter of a dual loop digital adaptive filter; subtracting the output of the dual loop digital adaptive filter from the digital primary signal to generate a digital cancelled signal; using the digital cancelled signal as the input to the second filter of a dual loop digital adaptive filter, and using the output of the second digital adaptive filter as an input to control the filter weights of the first digital adaptive filter.

Also provided herein is a full-duplex wireless communication system that includes a radio receiver input port, an antenna, or a receiver front end capable of receiving an analog primary signal; a transmitter capable of transmitting an analog transmitted signal; a directional coupler capable of sampling a portion of the analog transmitted signal to provide an analog reference signal; a first analog to digital converter capable of converting the analog primary signal into a digital primary signal; a second analog to digital converter capable of converting the analog reference signal into a digital reference signal; and a processor including instructions for: subtracting the output of a first adaptive filter from the digital primary signal, producing a digital cancelled signal; supplying the digital cancelled signal to a second adaptive filter; subtracting the output of the second adaptive filter from the digital reference signal, and using the difference as the input to the first adaptive filter.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
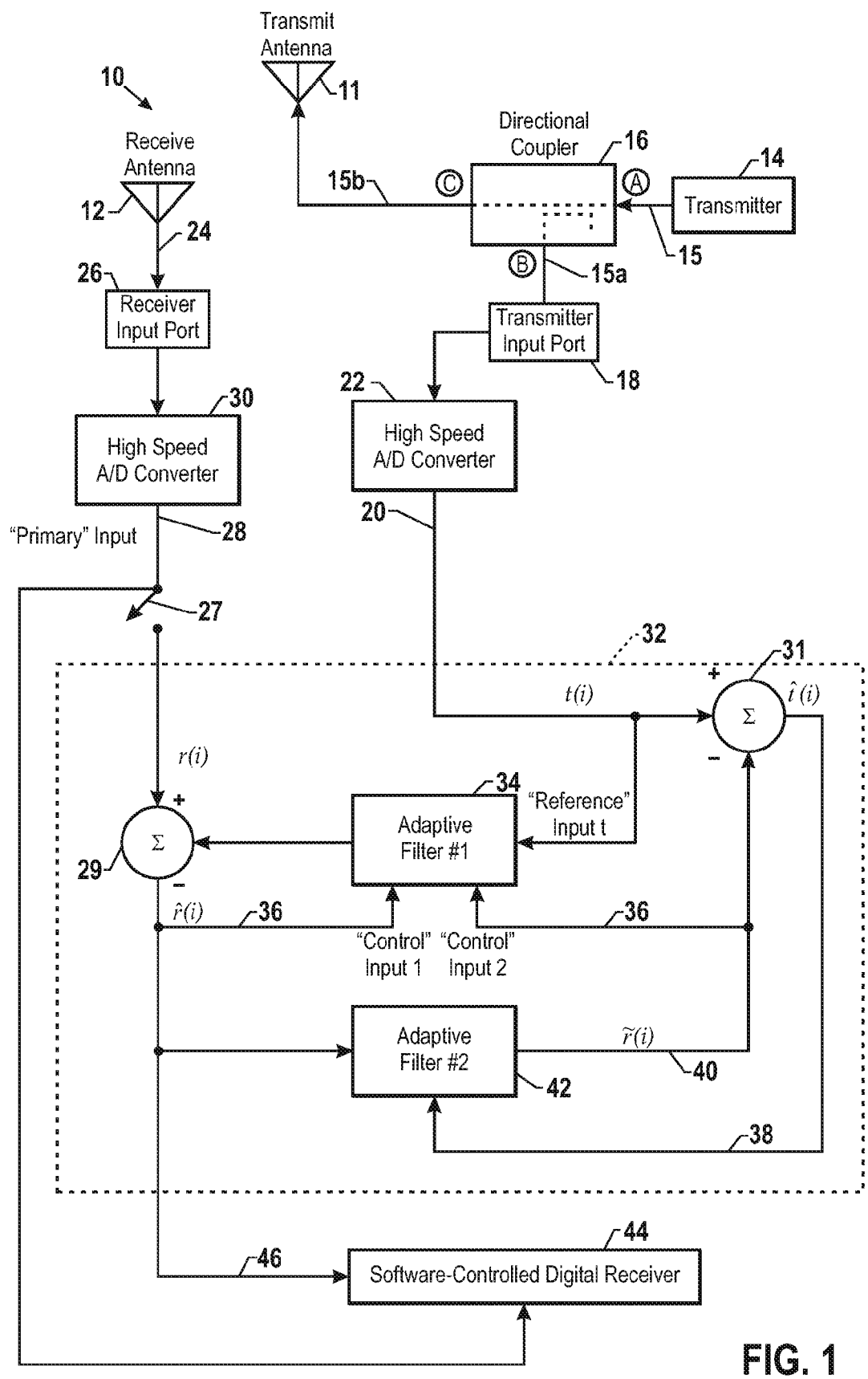
FIG. 1 is an exemplary wireless communication system including a digital adaptive filter.

The present techniques provide methods and systems for full-duplex RF communication that are bandwidth-efficient and that maintain high throughput. The present techniques may be used in conjunction with the simultaneous operation of a transmitter and receiver on the same frequency from common or co-sited antennas. As provided, the techniques provide the advantage of full-duplex radio frequency communication without frequency-, time-, or code-division multiplexing and without the use of hardware RF cancellers. Such techniques may be useful for wireless communication, such a cellular communication, radio communication, broadcasting, short-range point-to-point communication, wireless sensor networks, and wireless computer networks. Such techniques may also be applied to wire or cable-based communication, including telecommunications, computer networking, powerline carrier systems, twisted pair or coaxial cable communication, or DSL communication.

Signal interference between transmitted and received signals on co-sited or coupled antennas may result in a received signal including an interference component that is representative of the transmitted signal. During normal operation, the receiver input port will contain two signal components: a strong transmitter signal, and a significantly weaker received signal. Simple subtraction of the transmitted signal at the receiver end is insufficient to eliminate this interference, because the version of the transmitted signal that is received has usually undergone some distortion. The received copy of the transmitted signal may be "corrupted" by the following effects: multipath reflected images of the original signal, phase distortion and amplitude changes, and delay. Accordingly, a simple subtraction may not account for the type and magnitude of the changes in the transmitted signal interference component of the received signal.

In addition, the signal at the transmitter input port may also be corrupted by a weak component of the received signal present, i.e., a crosstalk component. If there is any significant leakage of the received signal through the directional coupler, which samples the transmitted signal, then a bias component will be introduced. A single adaptive filter that uses the signal from the transmitter input port to determine the filter tap solution may not account for crosstalk bias introduced by corruption of the transmitted signal. A resulting incorrect filter tap solution from a single adaptive filter may significantly degrade the output signal to something worse than that present at the input.

The present techniques provide a dual loop software-based adaptive filter to time- and phase-align the "clean" transmitted signal sampled at a transmitter input port to a "corrupted" version present at the receiver input port. Unlike previous approaches, the present techniques may be implemented using high-speed analog-to-digital (A/D) converters and software-controlled digital signal processors. By using two 14-bit converters and two digital adaptive filters, narrowband incoming signals that are 100 dB (or lower) below the level of the transmitted signal may be decoded, even if there is leakage of the received signal into the transmitter signal. While previous techniques have relied upon hardware RF cancellers, the present software-based techniques may provide more robust RF cancellation. The present techniques include a two loop digital adaptive filter unit in which a first digital filter may match the signal at the transmitter input port to the "corrupted" version of the transmitted component in the received signal and a second adaptive filter may estimate the crosstalk component of the received signal present at the transmitter input port.

Referring to FIG. 1, an exemplary full-duplex RF communications system 10 is depicted that includes a transmit antenna 11 and a receive antenna 12. In the transmitter portion of the system, a portion of the signal 15 from a transmit source (transmitter 14) is input to a directional coupler 16 to produce an attenuated signal 15a representative of the transmitted signal while the bulk of the signal 15b is input to the transmit antenna 11 and radiated as RF energy. The attenuated signal 15a is input to a transmitter input port 18 and is converted to a digital signal 20 by an A/D converter 22.

In the receiver portion of the system, a radiated RF signal is received by a receive antenna 12 to produce a received signal 24. In embodiments that involve cable or wire-based communication, a cable signal may be directly passed to the receiver front end 21 without being picked up by antenna 12. The received signal 24 is input to a receiver input port 26 and is converted to a digital signal 28 by an A/D converter 30. In embodiments, the received signal 24 and the attenuated signal 15a may be converted to digital signals by a single A/D converter, e.g., a high-speed 14-bit converter, or by multiple A/D converters, as illustrated in FIG. 1.

The resulting signals may then be processed digitally by an adaptive filter unit 32. The digital attenuated signal 20 may be input to a first digital adaptive filter 34. The digital filter 34 provides an estimate of the transmitted signal that may be subtracted from the received signal 28 (at the primary input) with summer 29 to provide a cancelled signal 36. This signal 36 may serve as the input to a second digital adaptive filter 42. The output 40 of the second adaptive filter 42 represents the received signal crosstalk present at the transmitter input port 18, which may be subtracted from the reference signal 20 via summer 31. Filter output signal 40, along with summer output difference signal 36 are used to control the filter tap weights of filter 34, while summer output difference signal 38 is used to control the taps of filter 42. The resultant signal 46 from the two adaptive filtering rounds is a cancelled received signal that may then be input to a software-controlled digital receiver 44 and may be further processed in any suitable manner. In an embodiment, the system 10 may include a bypass switch 27 for passing signal 24 directly to the receiver 44 without being processed by first digital adaptive filter 34. For example, such an embodiment may be implemented if the signal 24 is degraded or corrupted to such an extent that digital cancellation may not be effective.

The following signals may be defined: r(i)—the sampled receiver input port (signal 28); r̂(i)—the estimate of the received signal present at the receiver input port (signal 36); t(i)—the sampled transmitter input port (signal 20); t̂(i)—the estimate of the transmitted signal present at the transmitter input port (signal 38); and r̃(i)—The estimate of the received signal (crosstalk) present at the transmitter input port (signal 40).

The first digital adaptive filter 34 is a software-controlled filter that may include a backward adaptive filter or a block forward estimator, in embodiments. In one embodiment, the combination adaptive filter/summer difference equation is given by:

$$\hat{r}(i) = r(i) - \sum_{k=0}^{M-1} a(k)t(i-k) \quad (1)$$

where r̂(i) are the output samples, r(i) are the receiver input port samples, t(i) are the transmitter input port samples, M is the length of the adaptive filter, and a(k) are the adaptive filter taps.

The first adaptive filter 34 may equalize the transmitted signal sampled at the transmitter input port 18 such that it matches the "corrupted" version present at the receiver input port 26. In other words, first adaptive filter 34 estimates the following transfer function:

$$\frac{[\text{Directional\_Coupler\_Port\_A} \Rightarrow C][\text{TX\_Antenna}]}{[TX - RX\_\text{TransmissionPath}][\text{RX\_Antenna}]} \quad (2)$$
$$[\text{Directional\_Coupler\_Port\_A} \Rightarrow B]$$

The second adaptive filter 42 estimates the crosstalk component of the received signal present at the transmitter input port from the "cleaned up" received signal output from summer 29. In a similar fashion to 34, adaptive filter 42 estimates the following transfer function:

$$\frac{[\text{TX\_Antenna}][\text{Directional\_Coupler\_Port\_C} \Rightarrow B]}{[\text{RX\_Antenna}]} \quad (3)$$

The output of second adaptive filter 42 may be expressed as:

$$\tilde{r}(i) = \sum_{k=0}^{M-1} b(k)\hat{r}(i-k) \quad (4)$$

where b(k) are the adaptive filter tap weights for second adaptive filter 42. The filter taps may be estimated sequentially using a suitable gradient algorithm. For second adaptive filter 42, the tap update may use the standard algorithm:

$$b_i(k) = b_{i-1}(k) + 2\mu \hat{t}(i)\hat{r}(i-k) \quad (5)$$

where $b_i(k)$ and $b_{i-1}(k)$ are the new and previous estimates of the filter taps b(k), and μ is small number known as the step size. However, first adaptive filter 34 uses a modified version of the update algorithm to correct for the estimator bias that results from crosstalk:

$$a_i(k) = a_{i-1}(k) + 2\mu \hat{r}(i)[t(i-k) - \tilde{r}(i-k)] \quad (6)$$

where $a_i(k)$ and $a_{i-1}(k)$ are the new and previous estimates of the filter taps a(k).

Figure 2:
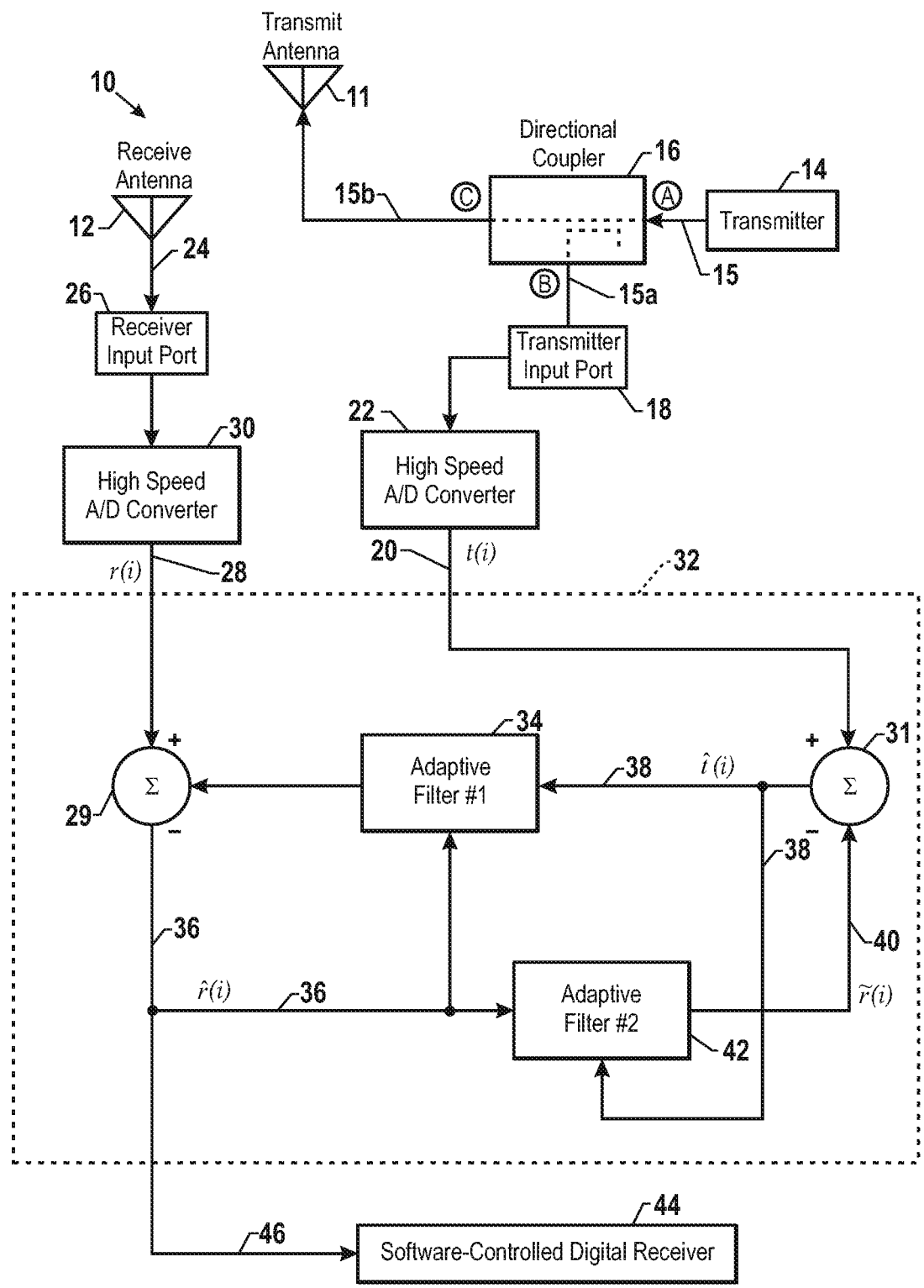
FIG. 2 is an alternative embodiment of a wireless communication system including a digital adaptive filter.

As given by Equation 6, the output signal 40 of the second adaptive filter 42 may be used as a second control input to the first adaptive filter 34 to determine the updated filter taps. An alternative filtering arrangement of the adaptive filter unit 32 is depicted in FIG. 2. As shown, the r̃(i) estimate, signal 40, may be directly subtracted (via summer 31) from the t(i) transmitter input port signal 20 before the input to the first adaptive filter 34. The resultant subtracted signal 38, is then input to the first digital adaptive filter 34. Subtracted signal 38 is also input to the second digital adaptive filter 42 to determine its filter weights. The output of filter 34 is subtracted from primary (receiver) signal 28 via summer 29, resulting in signal 36, which represents an estimate of the received signal component at the receiver input port 26. This signal 36 may serve as the input to a second digital adaptive filter 42, producing signal 40, which is an estimate of the crosstalk component of the received signal at the transmitter input port 18. The resultant signal 46 (which is the same as signal 36) from the two adaptive filtering rounds represents the received signal with any transmitted component cancelled.

Figure 3:
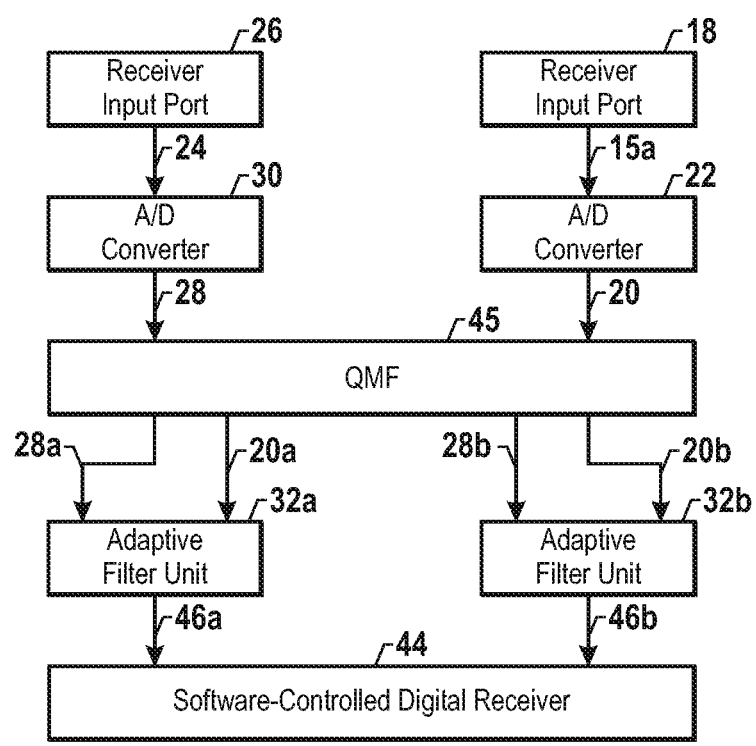
FIG. 3 shows an exemplary band separation system used in conjunction with digital adaptive filters.

Turning to FIG. 3, in some embodiments, the received signal spectrum may be divided prior to digital processing. For example, in embodiments, the entire wideband sampled spectrum may be divided into multiple bands, and a separate cancellation solution (e.g. adaptive filter processing) may be performed on each band. In embodiments, the signal spectrum may be separated into any number of bands. FIG. 3 shows an exemplary processing method in which the signal is divided into two separate bands prior to processing with adaptive filters. In the depicted embodiment, the received signal 24 from the receiver input port 26 is converted to a digital signal 28 by A/D converter 30. Similarly, attenuated transmit signal 15a from the transmitter input port 18 is converted to a digital signal 20 by A/D converter 22.

In embodiments, an efficient Quadrature Mirror Filter (QMF) structure 45 may be employed to perform the band separation of digital signals 28 and 20. Separated signals 28a and 20a that reflect corresponding bands may be processed together through two rounds of adaptive filtering in adaptive filter unit 32a to form a cancellation solution for a particular band. Separated signals 28b and 20b may likewise be processed together in adaptive filter 32b. The adaptive filter units 32a and 32b provide two cancellation solutions, 46a and 46b, which may be recombined by the software-controlled digital receiver 44.

Figure 4:
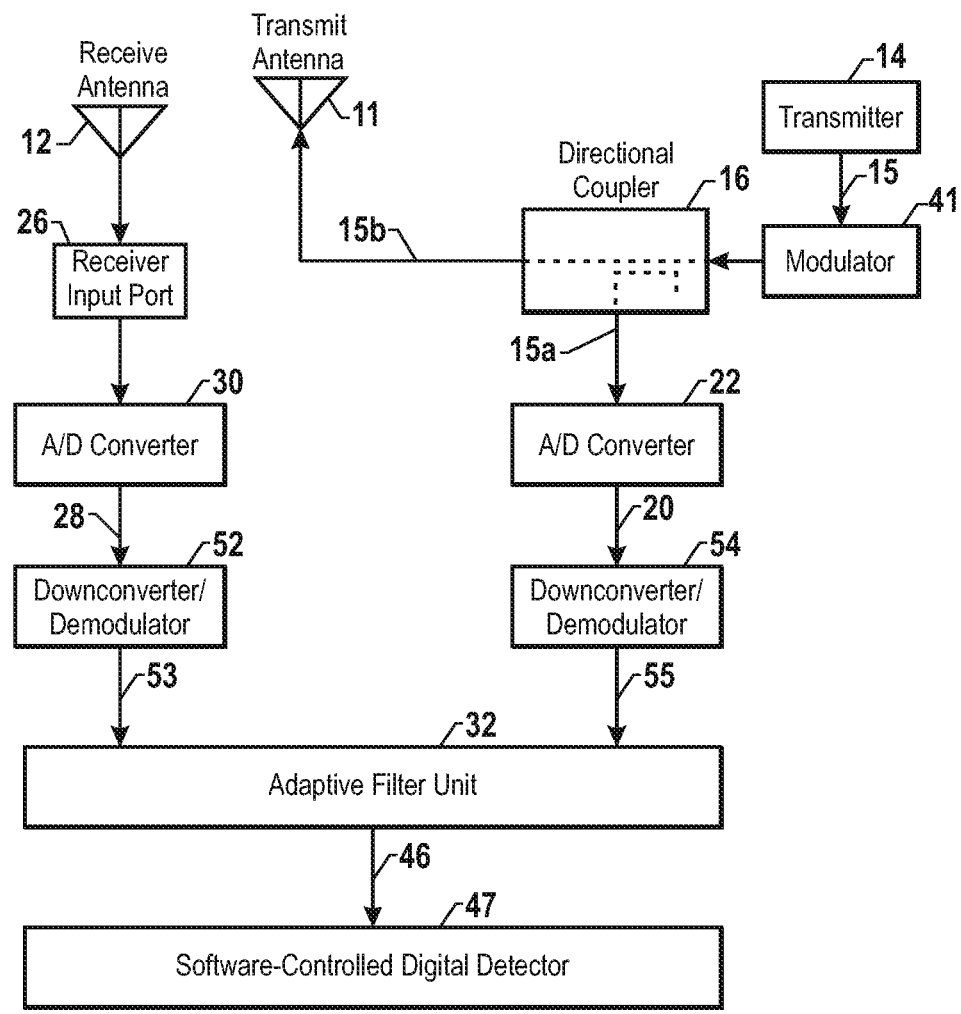
FIG. 4 is an alternative wireless communication system including a digital adaptive filter.

In alternative embodiments, a system 10 may include a wireless communication architecture in which the digital adaptive filter unit 32 is placed at the end of the software radio chain, either on the I/Q baseband signals or after the demodulation algorithm, as shown in FIG. 4. The depicted communications system 10 includes a transmit antenna 11 and a receive antenna 12. In the transmitter portion of the system, the signal 15 from transmitter 14 may be modulated by modulator 41 and input to a directional coupler 16 to produce an attenuated signal 15a representative of the transmitted signal while the bulk of the signal 15b is input to a transmit antenna 11 and radiated as RF energy. The attenuated signal 15a is input to a transmitter input port 18 and is converted to a digital signal 20 by A/D converter 22.

Receive antenna 12 produces a received signal 24 that is input to a receiver input port 26 and is converted to a digital signal 28 by A/D converter 30. In embodiments, if the demodulation is coherent, then two independent carrier recovery algorithms may be used for separately downconverted transmitter input port and receiver input port signals 55 and 53, respectively. In other embodiments the cancellation can occur after downconversion on the I and Q signals (but before demodulation), or that cancellation can occur after downconversion and demodulation. Digital signal 28 may be input to downconverter/demodulator 52 prior to being input to a digital adaptive filter unit 32. The digital attenuated signal 20, may be input to downconverter/demodulator 54 prior to being input to the digital adaptive filter unit 32. The resulting cancelled baseband signal 46 may be passed to a digital detector 47. In such embodiments, the adaptive filter unit 32 may operate at a relatively lower sampling rate (e.g., a 5000:1 decimation factor for some narrowband applications) as compared to architectures in which the transmitted and received signals undergo RF cancellation relatively early in the software radio chain.

Figure 5:
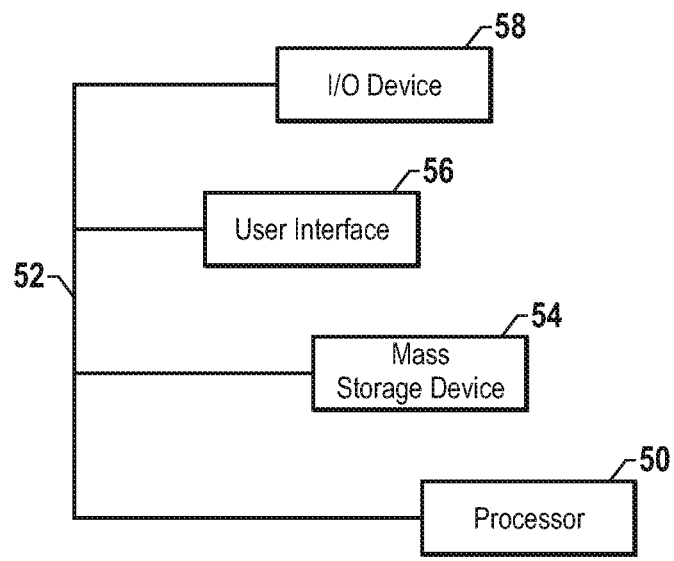
FIG. 5 is an exemplary hardware implementation of the present techniques.

FIG. 5 illustrates one embodiment of a hardware system intended to represent a broad category of computer systems such as personal computers, workstations, and/or embedded systems that may be used in conjunction with the present techniques. In embodiments, it is envisioned that the system 10 may include an external control that may include certain hardware and software components for implementing the present techniques, including control of the individual components of system 10. In the illustrated embodiment, the hardware system includes processor 50 and mass storage device 54 coupled to high speed bus 52. A user interface device 56 may also be coupled to the bus 52. User interface devices may include a display device, a keyboard, one or more external network interfaces, etc. An input/output device 58 may also be coupled to the bus 52. In an embodiment, the user interface, for example the display, may communicate certain information related to the status of the operation of one or both of the adaptive filters. For example, the display may display information relating to the quality of the dual loop adaptive filter cancellation. In embodiments in which the quality is compromised, an operator may choose to bypass the first adaptive filter 34 and proceed directly to the software-controlled receiver 38 with bypass switch 27.

Certain embodiments may include additional components, may not require all of the above components, or may combine one or more components. For instance, mass storage device 54 may be on-chip with processor 50. Additionally, the mass storage device 54 may include an electrically erasable programmable read only memory (EEPROM), wherein software routines are executed in place from the EEPROM. Some implementations may employ a single bus, to which all of the components are coupled, or one or more additional buses and bus bridges to which various additional components can be coupled. Additional components may include additional processors, a CD ROM drive, additional memories, and other peripheral components.

In one embodiment, the present techniques may be implemented using one or more computers such as the hardware system of FIG. 5. Where more than one computer is used, the systems can be coupled to communicate over an external network, such as a local area network (LAN), an internet protocol (IP) network, etc. In one embodiment, the techniques may be implemented as software routines executed by one or more execution units within the computer(s). For a given computer, the software routines can be stored on a storage device, such as mass storage device 54.

Figure 6:
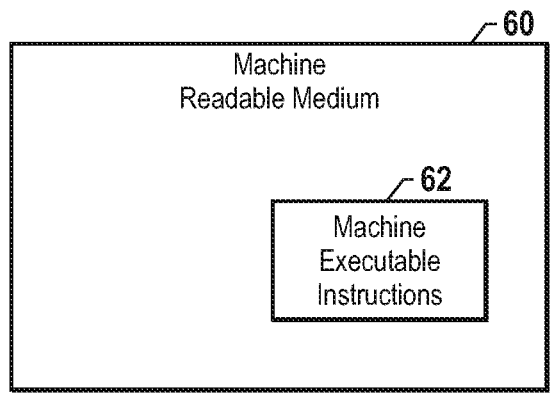
FIG. 6 is an exemplary software implementation of the present techniques.

Alternately, as shown in FIG. 6, the software routines can be machine executable instructions 60 stored using any machine readable storage medium 62, such as a diskette, CD-ROM, magnetic tape, digital video or versatile disk (DVD), laser disk, ROM, Flash memory, etc. The series of instructions may be received from a remote storage device, such as a server on a network, a CD ROM device, a floppy disk, etc., through, for instance, I/O device(s) 58 of FIG. 5. From whatever source, the instructions may be copied from the storage device into memory 54 and then accessed and executed by processor 50. In embodiments, it is envisioned that the software routines may be installed as an update package for an existing wireless communication system.

In embodiments, a communication system 10 may be part of a network that may include multiple nodes, each node including a system 10. The nodes may be interconnected with any suitable connection architecture and may be controlled, in embodiments, from a central station. For example, a network may include a cellular communication network. In such embodiments, each node or a subset of the nodes in the network may employ the digital adaptive filtering technique as provided.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method comprising:
   receiving an analog primary signal from a radio receiver input port, an antenna, or a receiver front end;
   receiving an analog reference signal locally generated and transmitted by a radio transmitter, wherein the radio transmitter is co-located with the radio receiver;
   converting the analog primary signal into a digital primary signal; converting the analog reference signal into a digital reference signal; and processing the digital reference signal with a dual loop digital adaptive filter, wherein a first adaptive filter of the dual loop digital adaptive filter uses the output of a second adaptive filter of the dual loop digital adaptive filter as one of the inputs for determining filter weights, to provide an output; and
   subtracting the direct output of the first adaptive filter of the dual loop digital adaptive filter from the digital primary signal to generate a digital cancelled signal.

2. The method of claim 1, comprising separating bands of one or both of the digital primary signal or the digital reference signal prior to processing the digital primary and digital reference signals with two or more dual loop digital adaptive filters.

3. The method of claim 1, comprising downconverting the digital primary signal and the digital reference signal to inphase and quadature components prior to processing the digital primary and digital reference signals with two dual loop digital adaptive filters.

4. The method of claim 1, comprising downconverting and demodulating the digital primary signal and the digital reference signal prior to processing the digital primary and digital reference signals with the dual loop digital adaptive filter.

5. The method of claim 1, wherein converting the analog primary signal into a digital primary signal comprises using a high speed analog to digital converter.

6. The method of claim 1, wherein converting the analog reference signal into a digital reference signal comprises using a high speed analog to digital converter.

7. The method of claim 1, wherein processing the digital primary signal with the dual loop digital adaptive filter comprises subtracting an estimate of crosstalk from the digital reference signal to provide a second input to determine filter weights.

8. A device programmed with machine-readable instructions for:
   receiving an analog primary signal from a radio receiver input port, an antenna, or a receiver front end;
   receiving an analog reference signal locally generated and transmitted by a radio transmitter, wherein the radio transmitter is co-located with the radio receiver;
   converting the analog primary signal into a digital primary signal; converting the analog reference signal into a digital reference signal; and
   processing the digital reference signal with a dual loop digital adaptive filter, wherein a first adaptive filter of the dual loop digital adaptive filter uses the output of a second adaptive filter of the dual loop digital adaptive filter as one of the inputs for determining filter weights, to provide an output; and
   subtracting the direct output of the first adaptive filter of the dual loop digital adaptive filter from the digital primary signal to generate a digital cancelled signal.

9. The device of claim 8, wherein the dual loop adaptive filter comprises a first adaptive filter comprising the following equation:

$$\hat{r}(i) = r(i) - \sum_{k=0}^{M-1} a(k)t(i-k)$$

wherein r̂(i) are the output samples, r(i) are the receiver input port samples, t(i) are the transmitter input port samples, M is the length of the adaptive filter, and a(k) are the adaptive filter tap weights.

10. The device of claim 9, wherein the dual loop adaptive filter comprises a second adaptive filter comprising the following equation:

$$\tilde{r}(i) = \sum_{k=0}^{M-1} b(k)\hat{r}(i-k)$$

wherein b(k) are the adaptive filter tap weights.

11. The device of claim 9, wherein the filter tap weights of the first filter are updated according to the following equation:

$$a_i(k) = a_{i-1}(k) + 2\mu\hat{r}(i)[t(i-k) - \tilde{r}(i-k)]$$

where $a_i(k)$ is an updated filter tap weight estimate and $a_{i-1}(k)$ is a previous estimates of filter taps a(k).

12. The device of claim 8, comprising instructions for separating bands of one or both of the digital primary signal or the digital reference signal prior to processing the digital primary and reference signals with two or more dual loop digital adaptive filters.

13. The device of claim 8, comprising instructions for downconverting the digital primary signal and the digital reference signal to inphase and quadature components prior to processing the inphase and quadature components of digital primary and reference signals with two dual loop digital adaptive filters.

14. The device of claim 8, comprising instructions for downconverting and demodulating the digital primary signal and the digital reference signal prior to processing the digital primary and reference signals with the dual loop digital adaptive filter.

15. The device of claim 8, wherein converting the analog primary signal into a digital primary signal comprises using a high speed analog to digital converter.

16. The device of claim 8, wherein converting the analog reference signal into a digital reference signal comprises using a high speed analog to digital converter.

17. The device of claim 8, wherein the machine-readable instructions comprise an upgrade package.

18. A full-duplex wireless communication system comprising:
a receiver input port, antenna, or receiver front end configured to receive an analog primary signal;
a transmitter configured to transmit an analog transmitted signal;
a directional coupler configured to sample a portion of the analog transmitted signal to provide an analog reference signal;
a first analog to digital converter configured to convert the analog primary signal into a digital primary signal;
a second analog to digital converter configured to convert the analog reference signal into a digital reference signal; and
a processor comprising instructions for:
processing the digital reference signal with a dual loop digital adaptive filter, wherein a first adaptive filter of the dual loop digital adaptive filter uses the output of a second adaptive filter of the dual loop digital adaptive filter as one of the inputs for determining filter weights, to provide an output; and
subtracting the direct output of the first adaptive filter of the dual loop digital adaptive filter from the digital primary signal to generate a digital cancelled signal.

19. The system of claim 18, wherein the processor comprises instructions for separating bands of one or both of the digital primary signal or the digital reference signal prior to processing the digital primary and reference signals with two or more dual loop digital adaptive filters.

20. The system of claim 18, comprising one or more downconverters and demodulators for downconverting and demodulating the digital primary signal and the digital reference signal prior to processing the digital primary and reference signals with the dual loop digital adaptive filter.

21. The system of claim 18, wherein one or both of the first analog to digital converter or the second analog to digital converter comprises a high speed analog to digital converter.

22. The system of claim 18, wherein the system does not comprise a hardware canceller configured to process the analog primary signal.

23. The system of claim 18, wherein the system comprises a cellular communication system.

24. The system of claim 18, wherein the system is part of a network, comprising a plurality of the full-duplex wireless communications systems.

25. The system of claim 18, comprising a bypass switch configured to bypass the digital adaptive filter and passing the digital primary signal directly to a receiver.

26. A full-duplex wireless communication system comprising:
a receiver input port, antenna, or receiver front end capable of receiving an analog primary signal;
a transmitter configured to transmit an analog transmitted signal;
a directional coupler configured to sample a portion of the analog transmitted signal to provide an analog reference signal;
a first analog to digital converter configured to convert the analog primary signal into a digital primary signal;
a second analog to digital converter configured to convert the analog reference signal into a digital reference signal; and
a processor configured to execute instructions for:
processing the digital reference signal with a first digital adaptive filter to provide a first output;
subtracting the first output of the first digital adaptive filter from the digital primary signal to generate a first filtered signal; and
processing the first filtered signal with a second digital adaptive filter to provide a second output, wherein the second output of the second digital adaptive filter is used as an input for determining filter weights of the first digital adaptive filter.

27. The system of claim 26, wherein the processor comprises instructions for subtracting the second output from the digital reference signal to provide an input for determining filter weights of the second digital adaptive filter.

28. The system of claim 26, wherein the system does not comprise time-division, frequency-division, or code-division multiplexed signal processing.

29. The system of claim 26, wherein the system does not comprise a hardware canceller configured to process the analog primary signal.

* * * * *